US012673603B2

(12) United States Patent
West et al.

(10) Patent No.: US 12,673,603 B2
(45) Date of Patent: Jul. 7, 2026

(54) WHEEL LIGHT MOUNTING SYSTEM

(71) Applicant: Shoreline Offroad, LLC, Brandenton, FL (US)

(72) Inventors: Joshua R. West, Brandenton, FL (US); Drake M. Ferronyalka, Palmetto, FL (US); Andre F. Ferronyalka, Palmetto, FL (US)

(73) Assignee: SHORRLINE OFFROAD, LLC, Bradenton, FL (US)

( * ) Notice: Subject to any disclaimer, the term of this patent is extended or adjusted under 35 U.S.C. 154(b) by 0 days.

(21) Appl. No.: 19/314,475

(22) Filed: Aug. 29, 2025

(65) Prior Publication Data

US 2026/0077704 A1     Mar. 19, 2026

Related U.S. Application Data

(60) Provisional application No. 63/695,875, filed on Sep. 18, 2024.

(51) Int. Cl.
*B60Q 1/00*          (2006.01)
*B60Q 1/24*          (2006.01)

(52) U.S. Cl.
CPC ............. *B60Q 1/0035* (2013.01); *B60Q 1/24* (2013.01)

(58) Field of Classification Search
CPC ....... B60Q 1/0041; B60Q 1/24; B60Q 1/0035
See application file for complete search history.

(56) References Cited

U.S. PATENT DOCUMENTS 6,962,427 B2 * 11/2005 Gloodt .................. B60Q 1/326
                                                              362/543

* cited by examiner

*Primary Examiner* — Anabel Ton
(74) *Attorney, Agent, or Firm* — Lewellyn Law, PLLC; Stephen Lewellyn

(57) ABSTRACT

A wheel light mounting system includes a mount configured to hold a plurality of lights in a generally circular arrangement, and a bracket assembly having one or more brackets configured to secure the mount to one or more vehicle components adjacent to a wheel such that the lights are positioned behind the wheel. At least one bracket is removably coupled to another bracket to permit removal of the mount from the vehicle components. The bracket assembly attaches to vehicle components other than a brake dust shield, thereby providing a stable and serviceable structure for positioning wheel lights visible through the wheel.

11 Claims, 11 Drawing Sheets

WHEEL LIGHT MOUNTING SYSTEM

CROSS-REFERENCE TO RELATED APPLICATIONS

This application claims the benefit of Provisional Patent Application Ser. No. 63/695,875, filed Sep. 18, 2024, the entirety of which is incorporated herein by reference.

FIELD OF THE INVENTION

The present invention relates to vehicle ornamental lighting and, more particularly, to a mounting system for attaching wheel lights behind vehicle wheels.

BACKGROUND OF THE INVENTION

Vehicle wheel lighting systems are known. One type of wheel lighting system has a ring-shaped array of LED lights that are mounted behind or around a vehicle's wheel. Installation may vary depending on the vehicle make and model of the vehicle, but typically, the lights are attached to the brake dust shield which is located behind the wheel.

Attaching a wheel light to the vehicle's brake dust shield, which is a thin and flimsy piece of metal, can create several problems due to the nature and function of the dust shield. The brake dust shield is a relatively thin, lightweight piece of metal. It is not built to support additional weight or structural components like an LED ring. Since the brake dust shield is not designed to hold additional components, using it as a mounting point for a wheel light does not offer long-term reliability. It's generally not advisable to mount anything to the brake dust shield due to its lack of structural strength. Accordingly, there is a need and a desire for a new mounting system for attaching wheel lights to vehicles behind the wheels.

SUMMARY OF THE INVENTION

Embodiments of the disclosure provide a wheel light mounting system for attaching wheel lights to a vehicle behind the wheels of the vehicle without attaching the wheel lights to the brake shields.

It is an object of embodiments of the disclosure to provide a wheel light mounting system for attaching wheel lights to a vehicle behind the wheels of the vehicle that provides for a stable and secure attachment, ensuring the wheel lights are firmly positioned behind the wheels.

It is an object of embodiments of the disclosure to provide a wheel light mounting system for attaching wheel lights to a vehicle behind the wheels of the vehicle that avoids interference with the rotor, caliper, or other brake components.

It is an object of embodiments of the disclosure to provide a wheel light mounting system for attaching wheel lights to a vehicle behind the wheels of the vehicle that can withstand road conditions and impacts, the system will ensure that the wheel lights are secure and functional for a longer period, reducing the need for frequent repairs or adjustments.

It is an object of embodiments of the disclosure to provide a wheel light mounting system for attaching wheel lights to a vehicle behind the wheels of the vehicle that can be easily attached to and removed from the vehicle using existing vehicle bolt locations.

It is an object of embodiments of the disclosure to provide a wheel light mounting system for attaching wheel lights to a vehicle behind the wheels of the vehicle that can be easily attached to and removed from the vehicle to perform vehicle service.

In one embodiment, a wheel light mounting system has a mount that is configured to hold a plurality of lights in a generally circular arrangement. A bracket assembly has one or more brackets that are configured to secure the mount to one or more vehicle components adjacent to a wheel such that the plurality of lights are positioned behind the wheel. At least one bracket of the one or more brackets is removably coupled to another at least one bracket of the one or more brackets to allow removal of the mount from the one or more vehicle components. The the one or more vehicle components are other than a brake dust shield.

In one embodiment, a vehicle component of the one or more vehicle components may be a steering knuckle.

In one embodiment, a vehicle component of the one or more vehicle components may be a wheel hub.

In one embodiment, at least one bracket of the one or more brackets may have one or more mounting holes that are configured to correspond to existing attachment points of the one or more vehicle components.

In one embodiment, at least one bracket of the one or more brackets may have a geometrical shape in a pattern that at least partially conforms to the shape of at least one of the one or more vehicle components.

In one embodiment, the mount may be ring-shaped.

Numerous additional objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception upon which this disclosure is based may readily be utilized as a basis for the designing of other structures, methods, and systems for carrying out the several purposes of the present invention.

For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
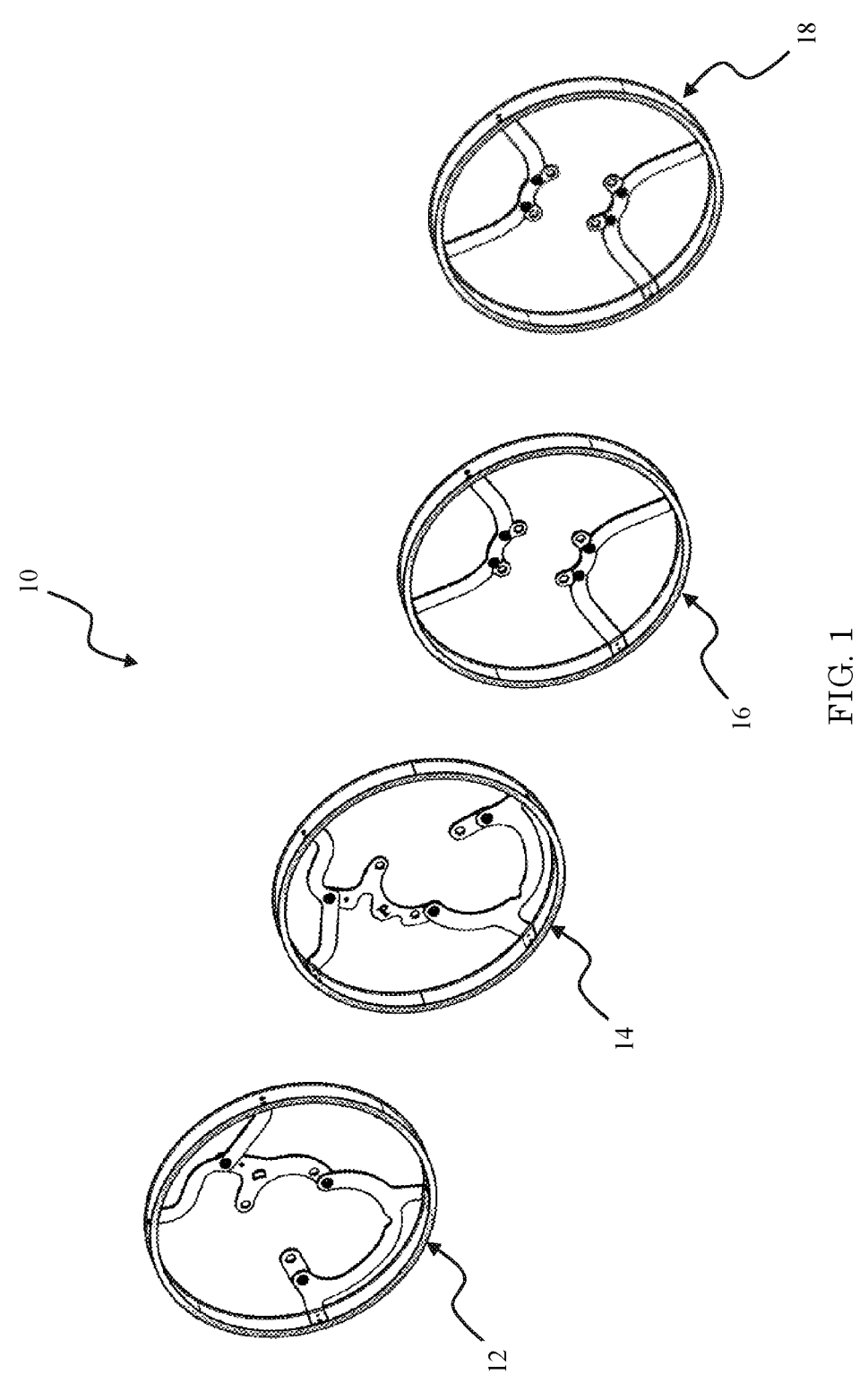
FIG. 1 is a perspective view of a wheel light mounting system according to an embodiment of the disclosure.

The present disclosure is directed toward a mounting system for attaching wheel ring lights to vehicles behind the wheels. To provide a clear understanding of their structure and function, certain exemplary embodiments will now be explained. These embodiments are illustrated in the accompanying drawings. It is important to note that the specific devices described and depicted in the drawings are non-limiting examples. Those skilled in the field will recognize that the features shown or discussed in one embodiment can be combined with features from other embodiments. Any such modifications or variations are considered to fall within the scope of this disclosure.

In FIG. 1, there is a diagrammatic perspective view of a wheel light mounting system 10 in accordance with an embodiment of the present disclosure. In the representatively illustrated embodiment, system 10 may include a first mounting bracket assembly 12, a second mounting bracket assembly 14, and a third mounting bracket assembly 16 (one for each vehicle side).

Representatively, mounting bracket assemblies 12, 14, and 16 may be configured for attachment to existing vehicle structures. For example, mounting bracket assembly 12 may be configured to attach to the driver-side steering knuckle of a vehicle, mounting bracket assembly 14 may be configured to attach to the passenger-side steering knuckle of a vehicle, and mount bracket assembly 16 may be configured to attach to either the driver-side and passenger-side axle assembly of the vehicle.

Figure 2:
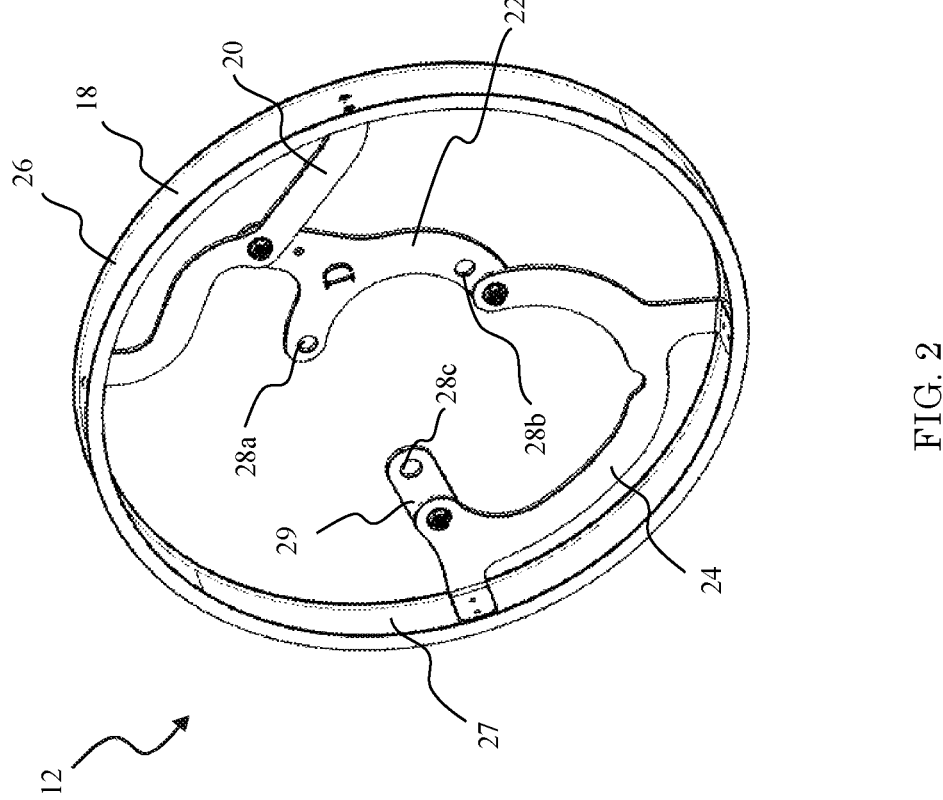
FIG. 2 is a perspective view of a mounting bracket assembly of a wheel lighting mounting system according to an embodiment of the disclosure.
Figure 3:
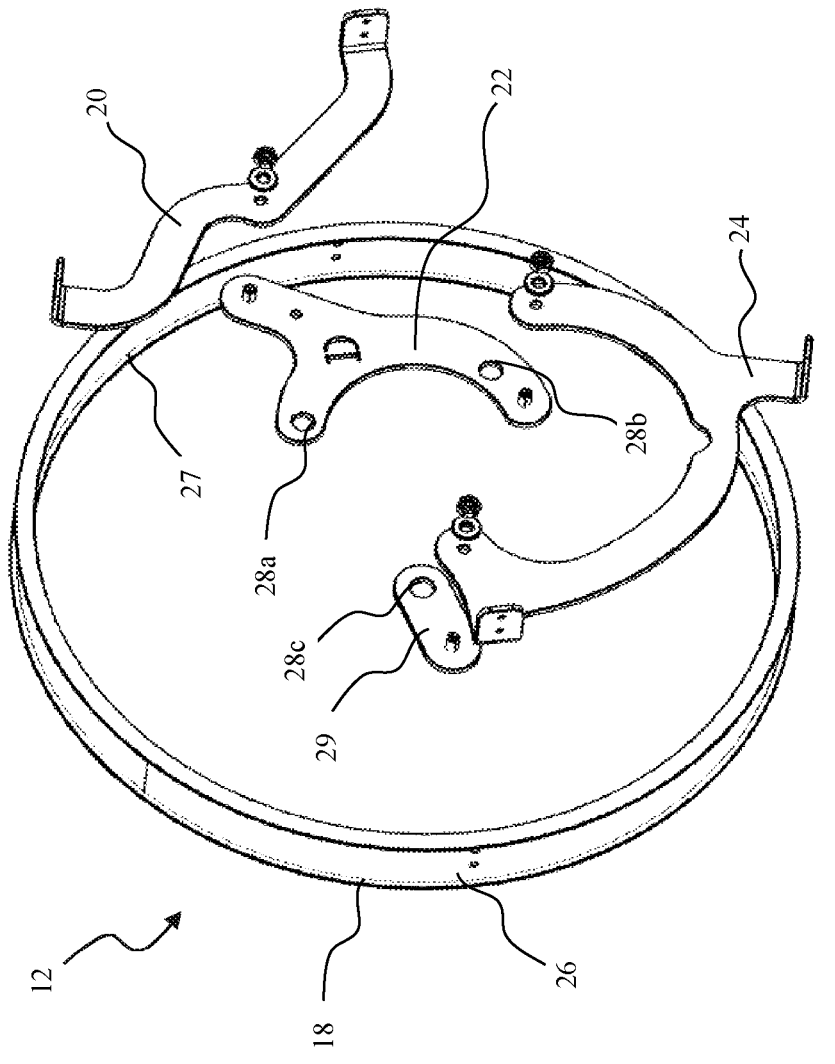
FIG. 3 is a perspective exploded view of the mounting bracket assembly of FIG. 2.

With reference to FIGS. 2 and 3, mounting bracket assembly 12 may have a ring-shaped member 18, a bracket member 20, a bracket member 22, and a bracket member 24. Ring-shaped member 18 is configured to have a wheel light attached to its outward-facing circumferential surface 26 and its inward-facing circumferential surface 27. Bracket members 20, 22, and 24 are disposed within the ring-shaped member 18, with member 20 attached to the ring member at circumferentially spaced locations, with member 24 attached to the ring member at circumferentially spaced locations opposite of member 20, and member 22 connecting members 20 and 24. Bracket member 24 may have extension 29 that is removably attached thereto or could be integrally formed therewith.

Bracket members 20, 22, and 24 are geometrically shaped to correspond to the vehicle structure to which mount bracket assembly 12 is to be attached. Representatively, bracket members 20, 22, and 24 are geometrically shaped to correspond to and wrap around various structural details of a driver's side steering knuckle of a vehicle. Additionally, bracket members 20, 22, and/or 24 have mounting holes that are located to correspond to several existing bolt locations of the steering knuckle, representatively three mounting holes 28a-28c. The mounting holes 28a-28c are strategically located so that the mounting bracket assembly 12 can be secured to the vehicle structure by existing bolted connections. In one example, mounting holes 28a and 28b may be located to correspond to axle hub or axle flange mounting bolt locations on the steering knuckle, and 28c could be located to correspond to a brake caliper mounting bolt on the steering knuckle.

It is important to note bracket assembly 12 is representatively shown with bracket members 20, 22, and 24; bracket assembly may have more or fewer bracket members depending on the existing vehicle structure to which bracket assembly 12 is to be attached.

Figure 4:
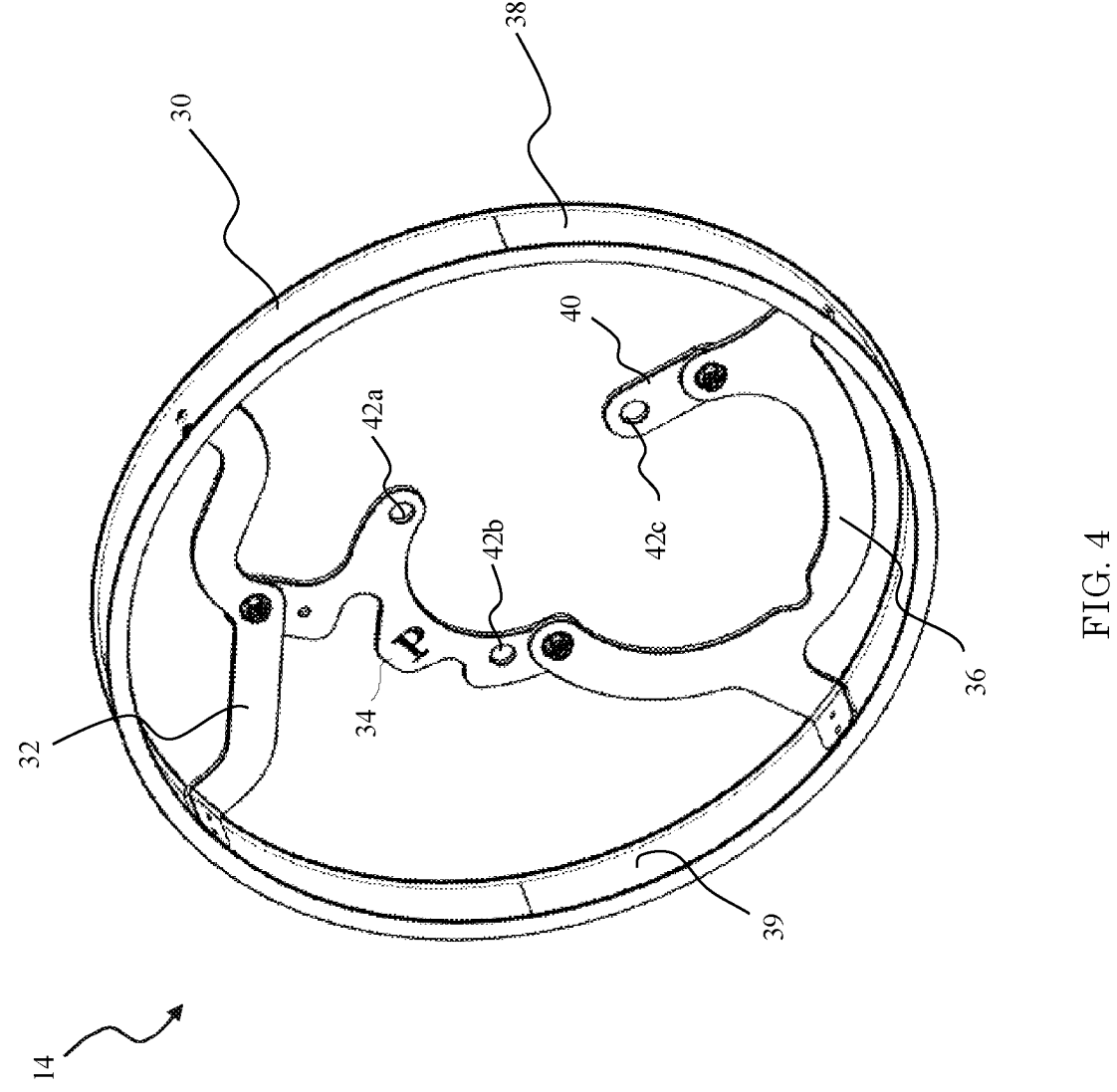
FIG. 4 is a perspective view of a mounting bracket assembly of a wheel lighting mounting system according to an embodiment of the disclosure.
Figure 5:
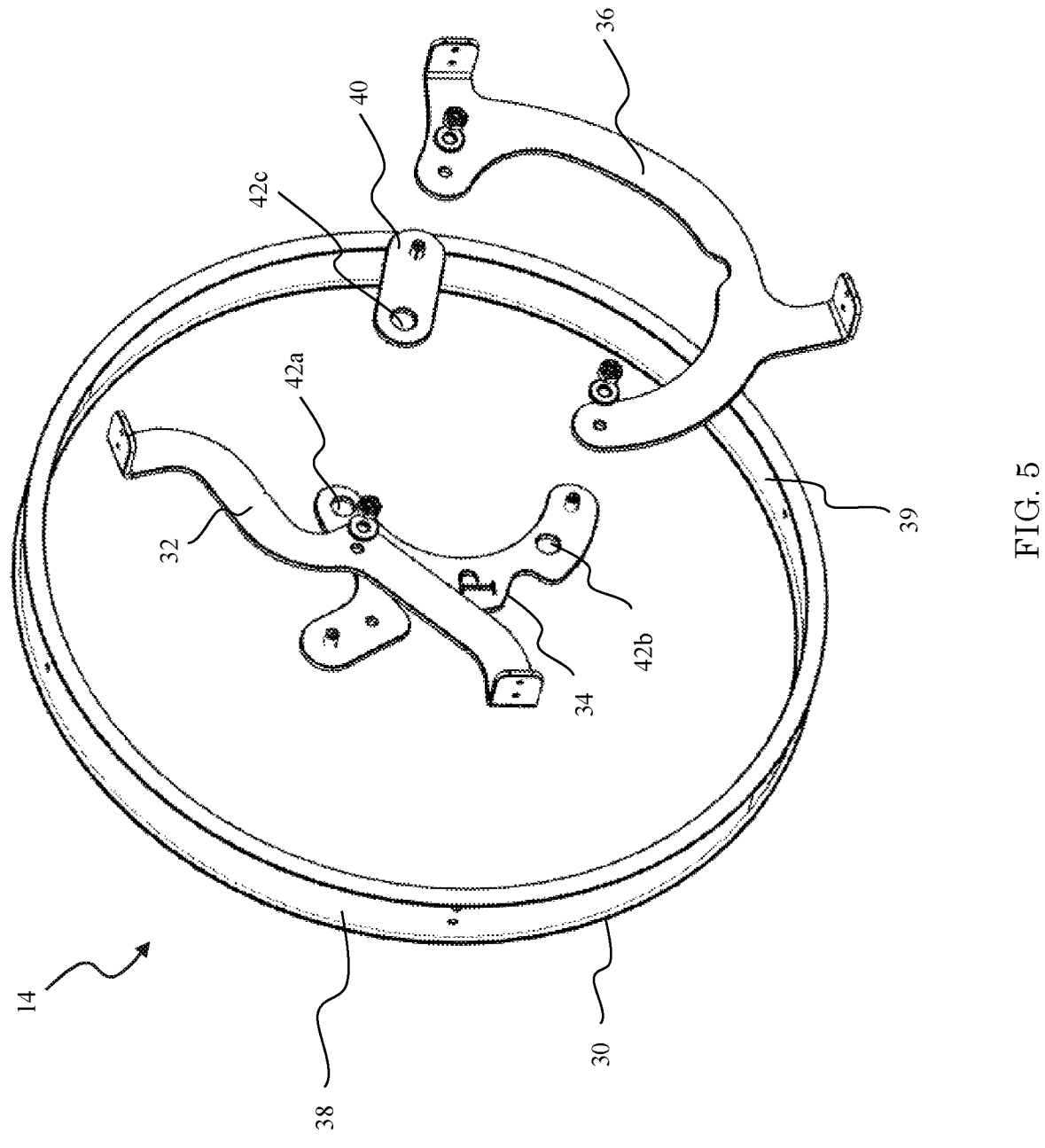
FIG. 5 is a perspective exploded view of the mounting bracket assembly of FIG. 4.

With reference to FIGS. 4 and 5, mounting bracket assembly 14 may have a ring-shaped member 30, a bracket member 32, a bracket member 34, and a bracket member 36. Ring-shaped member 30 is configured to have a wheel light attached to its outward-facing circumferential surface 38 and its inward-facing circumferential surface 39. Bracket members 32, 34, and 36 are disposed within the ring-shaped member 36, with member 32 attached to the ring member at circumferentially spaced locations, with member 36 attached to the ring member at circumferentially spaced locations opposite of member 32, and member 34 connecting members 32 and 36. Bracket member 34 may have extension 40 that is removably attached thereto or could be integrally formed therewith.

Bracket members 32, 34, and 36 are geometrically shaped to correspond to the vehicle structure to which mount bracket assembly 14 is to be attached. Representatively, bracket members 32, 34, and 36 are geometrically shaped to correspond to and wrap around various structural details of a passenger side steering knuckle of a vehicle. Additionally, bracket members 32, 34, and/or 36 have mounting holes that are located to correspond to several existing bolt locations of the steering knuckle, representatively three mounting holes 42a-42c. The mounting holes 42a-42c are strategically located so that the mounting bracket assembly 14 can be secured to the vehicle structure by existing bolted connections. In one example, mounting holes 42a-42b may be located to correspond to axle hub or axle flange mounting bolt locations on the steering knuckle, and 42c could be located to correspond to a brake caliper mounting bolt on the steering knuckle.

It is important to note bracket assembly 14 is representatively shown with bracket members 32, 34, and 36; bracket assembly may have more or fewer bracket members depending on the existing vehicle structure to which bracket assembly 14 is to be attached.

Figure 6:
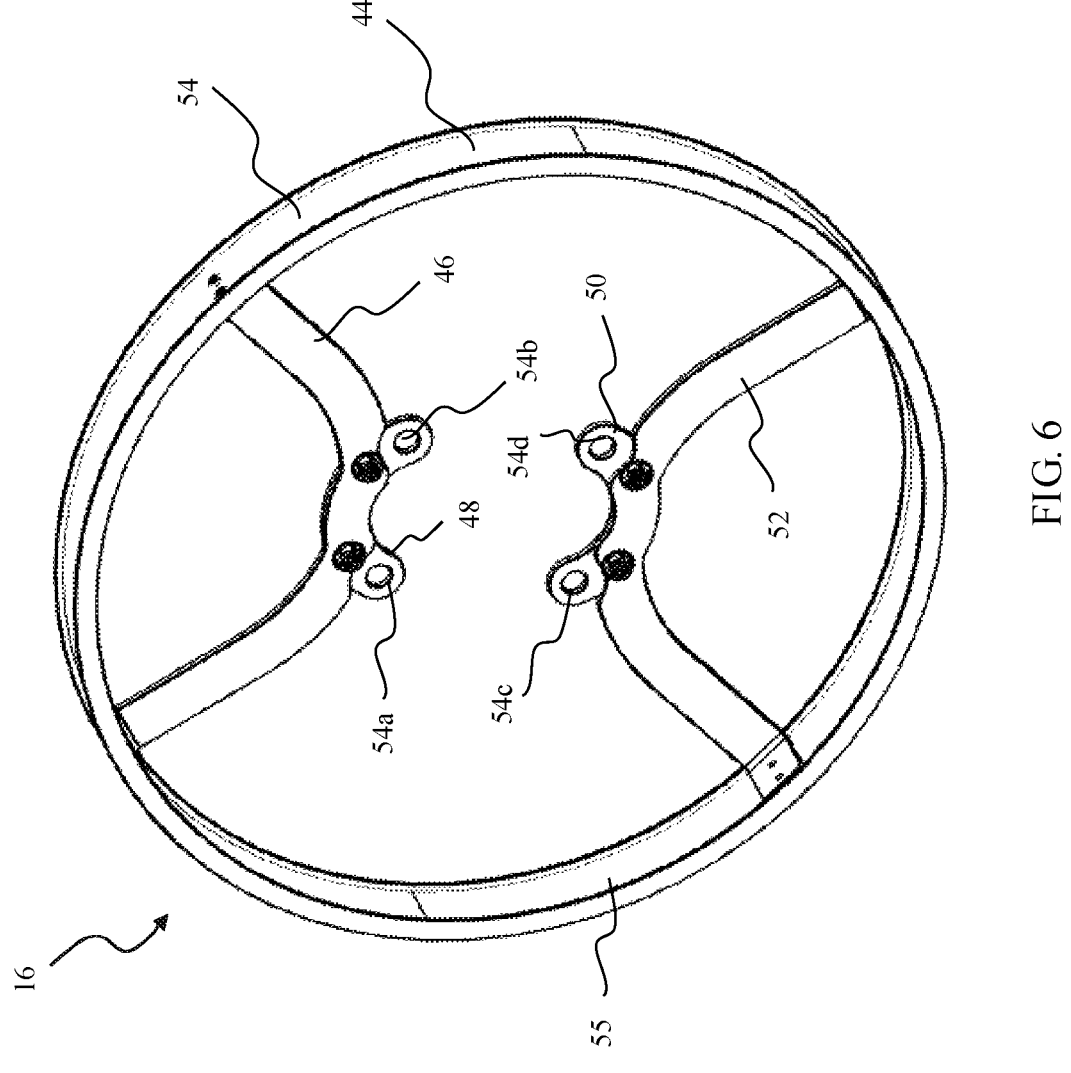
FIG. 6 is a perspective view of a mounting bracket assembly of a wheel lighting mounting system according to an embodiment of the disclosure.
Figure 7:
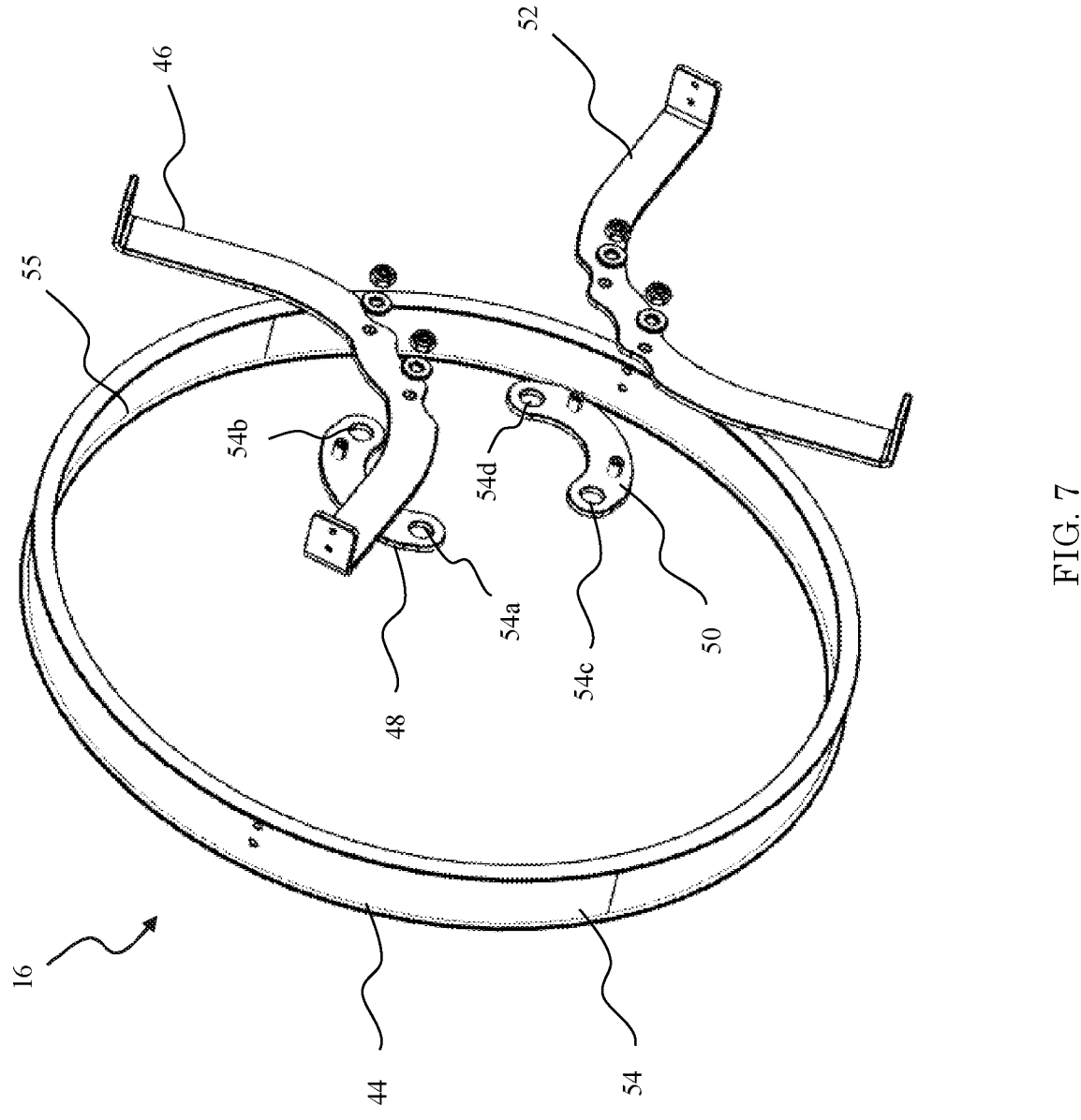
FIG. 7 is a perspective exploded view of the mounting bracket assembly of FIG. 6.

With reference to FIGS. 6 and 7, mounting bracket assembly 16 may have a ring-shaped member 44, a bracket member 46, a bracket member 48, a bracket member 50, and a bracket member 52. The representatively shown bracket assembly 16 is configured to attach to either the driver-side or the passenger-side rear axle assembly. Ring-shaped member 44 is configured to have a wheel light attached to its outward-facing circumferential surface 54 and its inward-facing circumferential surface 55. Bracket members 46, 48, 50, and 52 are disposed within the ring-shaped member 44. Member 46 is attached to the ring member at circumferentially spaced locations, and member 48 is attached to member 46 (but could be made integral therewith). Member 52 is attached to ring member 44 at circumferentially spaced locations opposite of member 46, and member 50 is attached to member 52 (but could be made integral therewith).

Bracket members 46, 48, 50, and 52 are geometrically shaped to correspond to the vehicle structure to which mount bracket assembly 16 is to be attached. Representatively, bracket members 46, 48, 50, and 52 are geometrically shaped to correspond to and wrap around various structural details of either the driver's side or passenger side rear axle assembly. Additionally, bracket members 48 and 50 have mounting holes that are located to correspond to several existing bolt locations of the axle assembly, representatively four mounting holes 54a-54d. The mounting holes 54a-54d are strategically located so that the mounting bracket assembly 16 can be secured to the vehicle structure by existing bolted connections. In one example, mounting holes 54a-54d may be located to correspond to axle hub or axle flange mounting bolt locations on the axle assembly.

It is important to note bracket assembly 16 is representatively shown with bracket members 46, 48, 50, and 52; bracket assembly may have more or fewer bracket members depending on the existing vehicle structure to which bracket assembly 16 is to be attached.

Figure 8:
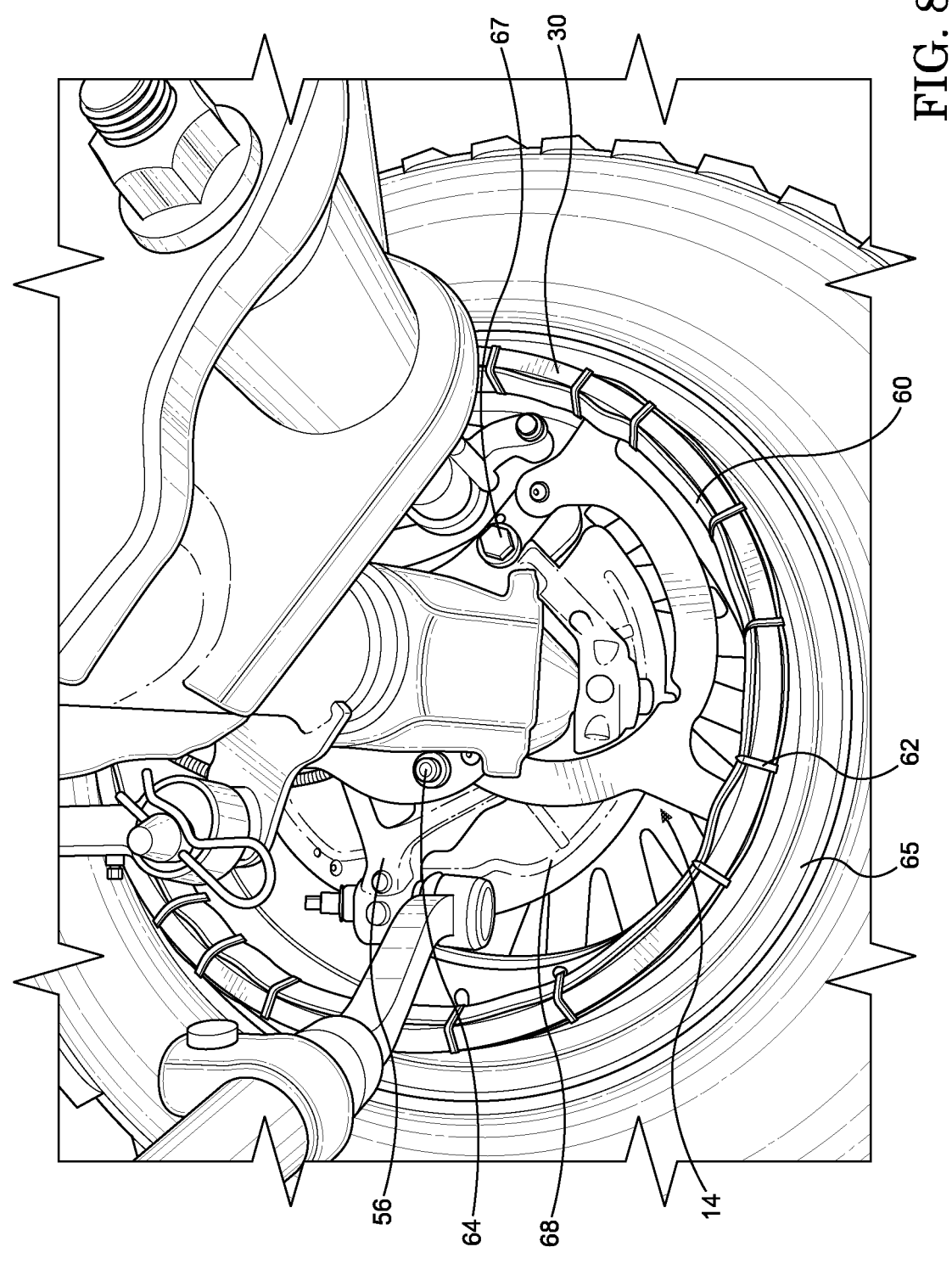
FIG. 8 is a first view showing a mounting bracket assembly of a wheel lighting mounting system attached to a steering knuckle of a vehicle and with ring lights attached.
Figure 9:
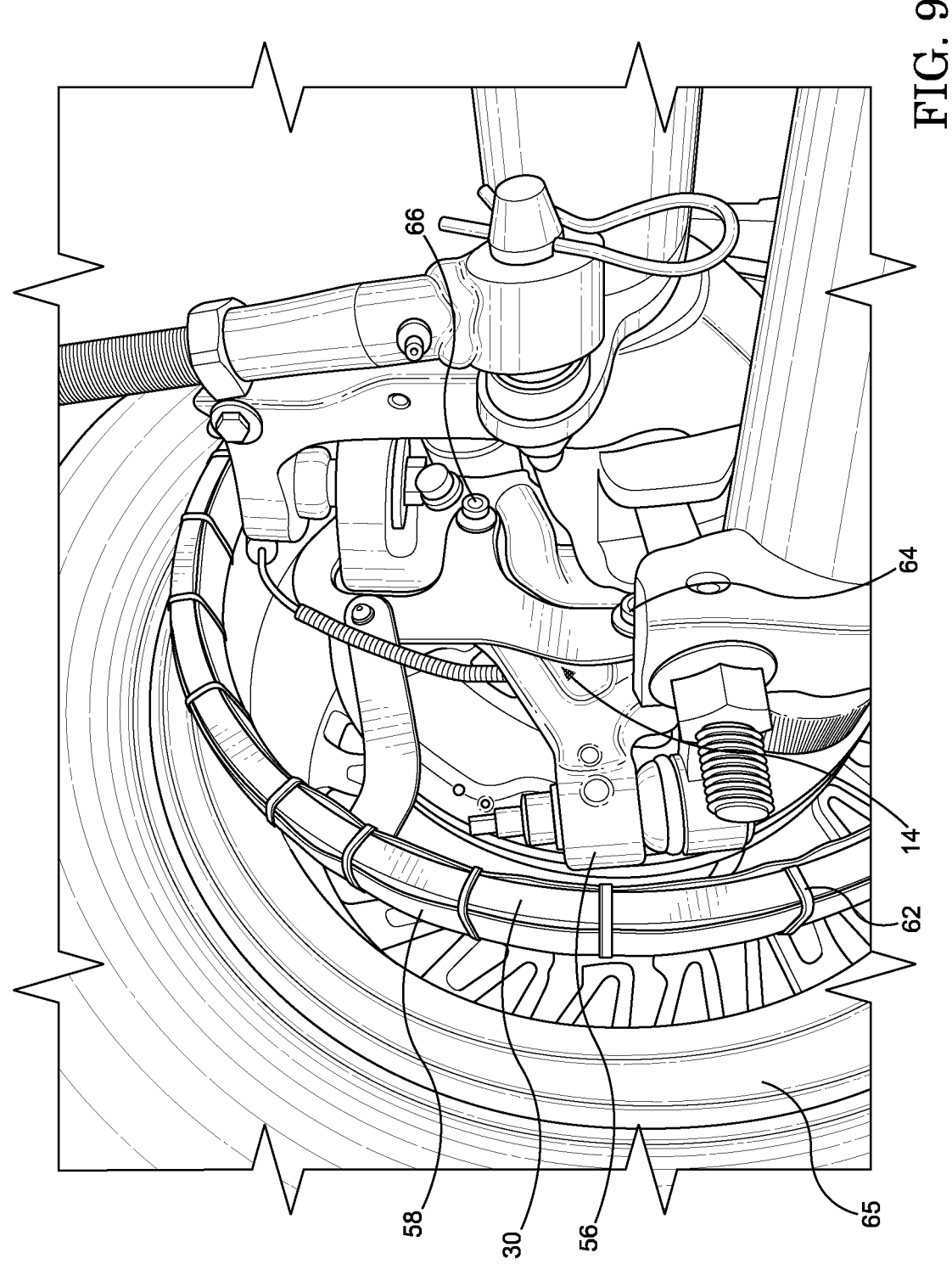
FIG. 9 is a second view showing a mounting bracket assembly of a wheel lighting mounting system attached to a steering knuckle of a vehicle and with ring lights attached.

FIGS. 8 and 9 show bracket assembly 14 attached to a representative passenger-side steering knuckle 56 of a vehicle. Ring lights 58 and 60 are attached, by strap fasteners 62, to the outer and inner circumferences, respectively, of the ring-shaped member 30, with the ring lights disposed behind the wheel 65. Further shown in the bracket assembly 14 attached to the steering knuckle 56 by existing bolts 64, 66, and 67 to rigidly secure the bracket assembly to the steering knuckle. This is also further shown in brake shield 68, to which ring lights are conventionally attached and which system 10 herein eliminates. While not shown, bracket assembly 12 may be similarly mounted to the driver-side steering knuckle.

Figure 10:
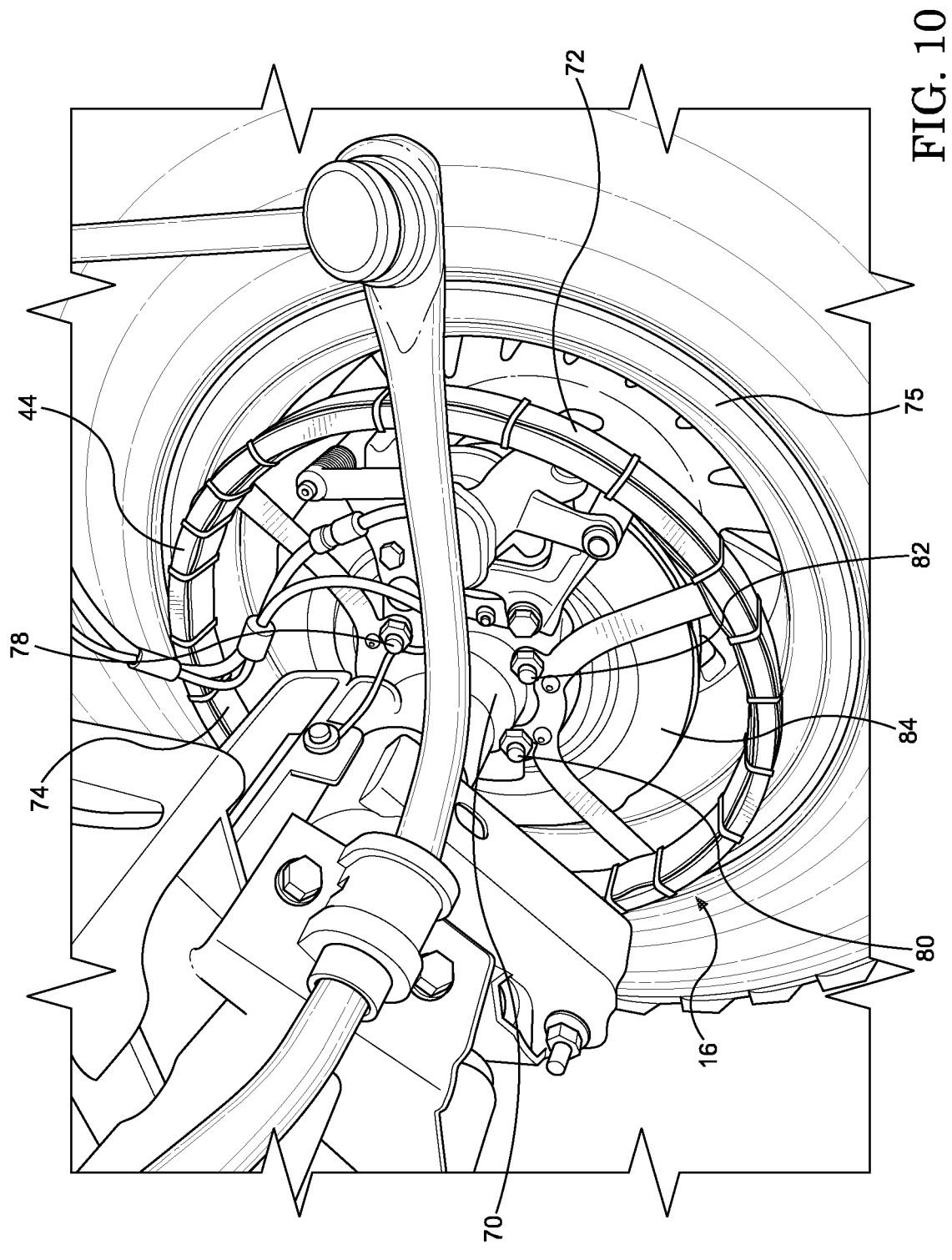
FIG. 10 is a first view showing a mounting bracket assembly of a wheel lighting mounting system attached to an axle hub assembly of a vehicle and with ring lights attached.
Figure 11:
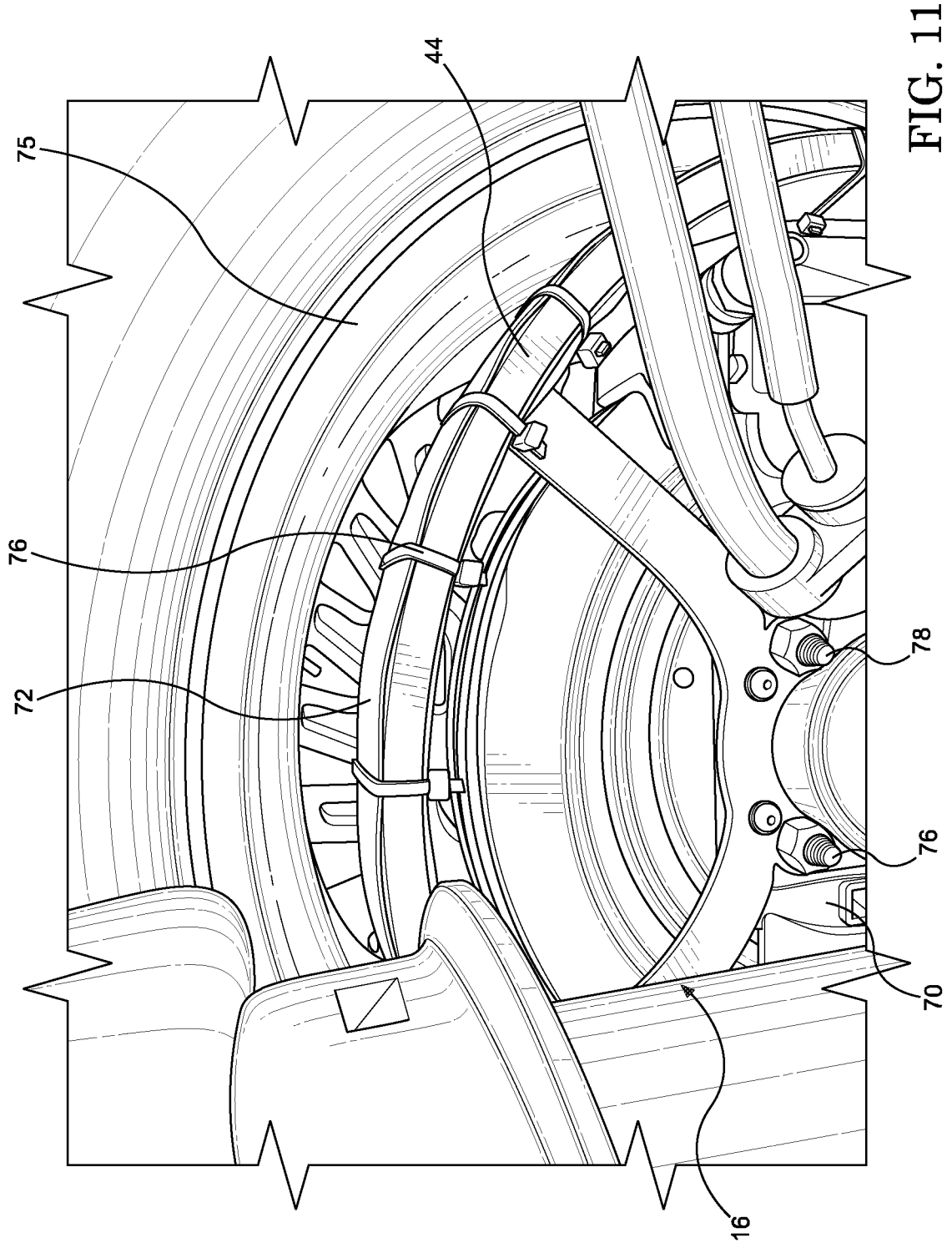
FIG. 11 is a second view showing a mounting bracket assembly of a wheel lighting mounting system attached to an axle hub assembly of a vehicle and with ring lights attached.

FIGS. 10 and 11 show bracket assembly 16 attached to a representative passenger-side rear axle hub assembly 70 of a vehicle. Ring lights 72 and 74 are attached, by strap fasteners 76, to the outer and inner circumferences, respectively, of the ring-shaped member 44, with the ring lights disposed behind the wheel 75. Bracket assembly 16 is attached to the axle hub assembly 70 by existing bolts 76, 78, 80, and 82 to rigidly secure the bracket assembly to the axle assembly. This is also further shown in brake shield 84, to which ring lights are conventionally attached and which system 10 herein eliminates. While not shown, bracket assembly 16 may be similarly mounted to the driver-side rear axle hub assembly.

Although the present invention has been described in connection with the preferred embodiments, it will be understood by those skilled in the art that various modifications and changes can be made thereto without departing from the spirit and scope of the present invention defined by the appended claims.

6

The invention claimed is:

1. A wheel light mounting system, comprising:
a mount configured to hold a plurality of lights in a generally circular arrangement;
a bracket assembly having one or more brackets configured to secure the mount to one or more vehicle components adjacent to a wheel such that the plurality of lights are positioned behind the wheel;
wherein at least one bracket of the one or more brackets is removably coupled to another at least one bracket of the one or more brackets to allow removal of the mount from the one or more vehicle components;
wherein the one or more vehicle components are other than a brake dust shield; and
wherein a vehicle component of the one or more vehicle components is a steering knuckle.

2. The wheel light mounting system of claim 1, wherein at least one bracket of the one or more brackets has one or more mounting holes that are configured to correspond to existing attachment points of the one or more vehicle components.

3. The wheel light mounting system of claim 1, wherein at least one bracket of the one or more brackets has a geometrical shape in a pattern that at least partially conforms to the shape of at least one of the one or more vehicle components.

4. The wheel light mounting system of claim 1, wherein the mount is ring-shaped.

5. A wheel light mounting system, comprising:
a ring-shaped mount configured to hold a plurality of lights in a generally circular arrangement;
a bracket assembly having one or more brackets configured to secure the ring-shaped mount to one or more vehicle components adjacent to a wheel such that the plurality of lights are positioned behind the wheel;
wherein at least one bracket of the one or more brackets is removably coupled to another at least one bracket of the one or more brackets to allow removal of the ring-shaped mount from the one or more vehicle components;
wherein at least one bracket of the one or more brackets has one or more mounting holes that are configured to correspond to existing attachment points of the one or more vehicle components;
wherein the one or more vehicle components are other than a brake dust shield; and
wherein a vehicle component of the one or more vehicle components is a steering knuckle.

6. The wheel light mounting system of claim 5, wherein a vehicle component of the one or more vehicle components is a wheel hub.

7. The wheel light mounting system of claim 5, wherein at least one bracket of the one or more brackets has a geometrical shape in a pattern that at least partially conforms to the shape of at least one of the one or more vehicle components.

8. A wheel light mounting system, comprising:
at least two wheel light mounts, each of the at least two wheel light mounts having:
a ring-shaped mount configured to hold a plurality of lights in a generally circular arrangement;
a bracket assembly having one or more brackets configured to secure the ring-shaped mount to one or more vehicle components adjacent to a wheel such that the plurality of lights are positioned behind the wheel, wherein at least one bracket of the one or more brackets is removably coupled to another at least one bracket of the one or more brackets to allow removal of the ring-shaped mount from the one or more vehicle components, and wherein at least one bracket of the one or more brackets has one or more mounting holes that are configured to correspond to existing attachment points of the one or more vehicle components;

wherein a vehicle component of the one or more vehicle components of one wheel light mount of the at least two wheel light mounts is a steering knuckle; and wherein a vehicle component of the one or more vehicle components of a second wheel light mount of the at least two wheel light mounts is an axle hub.

9. The wheel light mounting system of claim 8, wherein at least one of the one or more mounting holes of each of the at least two wheel light mounts corresponds to an axle hub mounting bolt.

10. The wheel light mounting system of claim 1, wherein at least one bracket of the one or more brackets has one or more mounting holes that are configured to correspond to existing attachment points of the one or more vehicle components, wherein at least one of the one or more mounting holes corresponds to an axle hub mounting bolt.

11. The wheel light mounting system of claim 5, wherein at least one of the one or more mounting holes corresponds to an axle hub mounting bolt.

\* \* \* \* \*